United States Patent Office 2,764,591
Patented Sept. 25, 1956

2,764,591
PROCESS FOR BENZYLATING CERTAIN AROMATIC AMINES

Yaïr Sprinzak, Rehoboth, Israel

No Drawing. Application December 10, 1952,
Serial No. 325,210

Claims priority, application Israel February 7, 1952

9 Claims. (Cl. 260—296)

The present invention relates to the preparation of arylamines or heterocyclic amines mono-benzylated in the amino group or groups.

Secondary N-benzyl arylamines are usually prepared by the action of a benzyl halide, such as benzyl chloride or benzyl bromide, on the corresponding primary arylamine. This method produces at the same time a certain amount of the corresponding tertiary dibenzyl amine which is difficult to separate from the secondary amine. The formation of the dibenzyl aryl amine can be more or less suppressed by the use of an excess of primary amine. This, however, involves the recovery of the unreacted excess of primary amine and requires large reaction vessels. The difficulty of obtaining a defined yield of one single benzylated amine is even greater where the primary amine contains two or more amino groups apt to be benzylated.

If heterocyclic amines with nitrogen as hetero atom are treated with benzyl halides, they are apt to undergo benzylation in the nuclear nitrogen atom, though this can be avoided to a certain extent by effecting the benzylation in the presence of an alkali metal amide.

It has now been found that the mono-benzylation of arylamines and of heterocyclic amines of aromatic character can be effected in a simple manner and with good yield by using benzyl alcohol as the benzylating agent, and continuously removing the water forming by the reaction.

Accordingly the invention consists in a process of preparing secondary benzyl arylamines or benzyl heterocyclic amines of aromatic character, wherein the corresponding primary amines are reacted with benzyl alcohol in the presence of anhydrous alkali hydroxide, and the water forming by the reaction is continuously removed from the reaction mixture.

The benzyl alcohol is preferably used in small excess of the stoichiometrically required amount.

The term "anhydrous alkali hydroxide" includes the usual commercial solid product.

The terms "arylamine" and "heterocyclic amine," as used in connection with this invention, include such derivatives as contain alkyl, aryl, alkoxy, aryloxy, alkylamino, or arylamino radicals as nuclear substituents.

The reaction is carried out at boiling temperature and the water forming by the reaction is continuously allowed to distil off. The progress of the reaction can be followed by observing on the one hand the rise of the boiling temperature in the reaction mixture, on the other hand the quantity of water collected as distillate.

Where the amine used as starting material contains more than one primary amino group, all of them can be converted into secondary benzylamino groups by using a corresponding amount of benzyl alcohol.

The reaction is facilitated if a small amount of benzaldehyde or substituted benzaldehyde, corresponding to the benzyl alcohol used, is present, in which case a smaller proportion of alkali hydroxide may be used for a same rate of reaction.

Known uses of the secondary benzylamines obtainable by the process according to the invention include their use as intermediates in the manufacture of dyestuffs, therapeutical substances and insecticides, and for various other purposes.

The invention is illustrated by the following examples to which it is not limited.

Example 1.—N-benzyl aniline

A mixture of 45.5 gr. of aniline, 70 gr. of benzyl alcohol and 12 gr. of anhydrous potassium hydroxide is heated in a distillation flask and the water forming by the reaction is continuously removed by distillation. The heating is interrupted when the temperature of the boiling mixture has reached 250° C. The condensed water distillate amounts to 9 gr. The reaction mixture is then cooled and 50 gr. of water are added. The reaction product crystallises and is filtered off, washed with water and dried. The crystallisation is facilitated by seeding the mixture with a crystal of N-benzyl aniline. The yield is 86 gr. (94%) of pure N-benzyl aniline of M. P. 35–36° C. Instead of by crystallisation, the N-benzyl aniline can be separated from the reaction mixture with an equal degree of purity and in the same yield by fractional distillation in vacuo. The desired product distils at 191° C. under a pressure of 23 mm. Hg.

Example 2.—N-benzyl aniline

A mixture of 46.5 gr. of aniline, 54 gr. benzyl alcohol and 4 gr. of anhydrous potassium hydroxide is heated to boiling and 2 gr. of benzaldehyde, diluted with 16 gr. of benzyl alcohol, are added in portions to the boiling mixture at intervals of 15 minutes. The process is for the rest carried out as described in Example 1 and yields a similar amount of similarly pure N-benzyl aniline.

Example 3.—m-Benzylamino toluene

A mixture of 53.5 gr. of m-toluidine, 54 gr. of benzyl alcohol and 5 gr. of potassium hydroxide is heated to boiling and 2 gr. of benzaldehyde, diluted with 16 gr. of benzyl alcohol, are added to the boiling mixture in three equal portions when the temperature has reached 207° C., 210° C., and 224° C., respectively. The water forming by the reaction is removed continuously by distillation. The heating is interrupted when the temperature of the boiling mixture has reached 250° C. The water distillate amounts then to 9 gr. After cooling, 30 gr. of water are added to the reaction mixture. Two layers are obtained. The layer containing the organic matter is separated, washed twice with a saturated aqueous sodium chloride solution and thereafter submitted to fractional distillation in vacuo, the desired m-benzyl-aminotoluene distilling at 178° C. under a presure of 7 mm. Hg. Yield: 91 gr. (92%).

Example 4.—p-Benzylamino diphenylamine

A mixture of 46 gr. of p-amino-diphenylamine, 50 gr. of benzyl alcohol and 4 gr. of potassium hydroxide is heated to boiling and the water forming by the reaction is removed continuously by distillation. The heating is interrupted when the temperature of the boiling mixture has reached 255° C. The water distillate amounts then to 4.5 gr. The reaction mixture is cooled and 60 gr. of water are added. The reaction product crystallizes and is filtered off, washed with water and dried. 63.3 gr. (95%) of the hitherto unknown p-benzylamino diphenylamine of M. P. 73–74° C. are obtained. Re-crystallized from alcohol it melts at 74–75° C.

Example 5.—N-benzyl-2-naphthylamine

A mixture of 35.8 gr. of 2-naphthylamine, 42 gr. of benzyl alcohol and 3 gr. of potassium hydroxide is heated to boiling and the water forming by the reaction is removed continuously by distillation. The heating is interrupted when the temperature of the boiling mixture has reached 260° C. The water distillate amounts then to 4.5 gr. The reaction mixture is cooled and 70 gr. of water are added. The reaction product crystallizes, and is filtered off, washed with water and dried. N-benzyl-2-naphthylamine of M. P. 66-67° C. is obtained. Yield: 55.3 gr. (95%).

*Example 6.—2.6-dibenzylamino pyridine*

A mixture of 36.3 gr. of 2.6-diamino pyridine, 42 gr. of benzyl alcohol and 5 gr. of potassium hydroxide is heated to boiling and the water forming by the reaction is removed continuously by distillation. The heating is interrupted when the temperature of the boiling mixture has reached 245° C. The water distillate amounts then to 12 gr. After cooling the reaction mixture, 70 gr. of water are added thereto, the reaction product crystallizes and is filtered, washed with water and dried. 92.2 gr. (96%) of the hitherto unknown 2.6-dibenzylamino pyridine of M. P. 69-71° C. are obtained. After recrystallisation from alcohol this substance melts at 72° C.

Other secondary benzyl arylamines or benzyl heterocyclic amines obtainable by the process according to the invention are, for example, the following:

o-Benzylamino toluene
p-Benzylamino anisol
1-benzylamino naphthalene
p-Dibenzylamino benzene
2-benzylamino pyridine
N-anisyl aniline
m-Dibenzylamino benzene, M. P. 71.5-72.5° C. (from alcohol)
2-benzylamino diphenyl, M. P. 89.5-90° C. (from alcohol)
4-benzylamino diphenyl, M. P. 94.0-94.5° C. (from alcohol)
4.4'-dibenzylamino diphenyl ether, m. p. 99.5-100° C.
1.5-dibenzylamino naphthalene, M. P. 184.5-185.5° C. (from toluene)
2-benzylamino-4-methyl pyridine M. P. 95-96° C. (from alcohol).

The last six substances of this list are new.

I claim:

1. A process of N-mono-benzylating a primary amine of the general formula $R.(NH_2)_n$ in a homogeneous reaction system and without detectable formation of tertiary amine by reacting the primary amine in the presence of anhydrous alkali hydroxide with benzyl alcohol and continuously removing the water formed by the reaction in which formula R stands for a radical selected from the group consisting of phenyl, naphthyl, lower-alkyl-phenyl, lower-alkoxy-phenyl, diphenyl, phenoxy-phenyl, phenyl-amino-phenyl, aminophenoxy-phenyl, alkylamino phenyl, pyridyl and lower-alkyl-pyridyl radicals, and $n$ is an integer from 1 to 2.

2. A process as claimed in claim 1, wherein the benzyl alcohol is used in small excess over the stoichiometrically required amount.

3. A process as claimed in claim 1, wherein a small amount of a benzaldehyde corresponding to the benzyl alcohol used is added to the reaction mixture.

4. A process as claimed in claim 1, wherein the reaction is carried out at the boiling temperature of the reaction mixture and the water forming by the reaction is continuously distilled off.

5. A process as claimed in claim 4, wherein N-benzyl-aniline is formed by the reaction of aniline with benzyl alcohol.

6. A process as claimed in claim 4, wherein m-benzyl-amino toluene is formed by the reaction of m-toluidine with benzyl alcohol.

7. A process as claimed in claim 4, wherein p-benzyl-amino diphenylamine is formed by the reaction of p-amino-diphenylamine with benzyl alcohol.

8. A process as claimed in claim 4, wherein N-benzyl-2-naphthylamine is formed by the reaction of 2-naphthyl-amine with benzyl alcohol.

9. A process as claimed in claim 4, wherein 2.6-dibenzylamino pyridine is formed by the reaction of 2.6-diamino pyridine with benzyl alcohol.

References Cited in the file of this patent

UNITED STATES PATENTS 2,451,642    Watson                Oct. 17, 1948

OTHER REFERENCES

Sabetay et al.: Chem. Abst., vol. 24, pp. 1099 and 2082 (1930).
Sabetay et al.: Chem. Abst., vol. 25, p. 1817 (1931).
Rosenmund et al.: Ber. Deut. Chem., vol. 58, pp. 2054-8 (1925).
Busse et al.: Chem. Abst., vol. 25, pp. 2700-1 (1931).
Awe et al.: Chem. Abst., vol. 31, p. 687 (1937).
Clemo et al.: Chem. Abst., vol. 33, pp. 7798-9 (1939).
Beilstein: vol. 13, pp. 19 and 82 (1930).